United States Patent
Pluemer (10) Patent No.: US 9,945,755 B2
(45) Date of Patent: Apr. 17, 2018

(54) METHODS FOR USING DIGITIZED SOUND PATTERNS TO MONITOR OPERATION OF AUTOMATED MACHINERY

(71) Applicant: Marquip, LLC, Phillips, WI (US)

(72) Inventor: Blake Pluemer, Phillips, WI (US)

(73) Assignee: Marquip, LLC, Phillips, WI (US)

( * ) Notice: Subject to any disclaimer, the term of this patent is extended or adjusted under 35 U.S.C. 154(b) by 262 days.

(21) Appl. No.: 14/870,256

(22) Filed: Sep. 30, 2015

(65) Prior Publication Data

US 2016/0091398 A1 Mar. 31, 2016

Related U.S. Application Data

(60) Provisional application No. 62/057,478, filed on Sep. 30, 2014.

(51) Int. Cl.
*G01M 99/00* (2011.01)
*G01M 7/00* (2006.01)
*G05B 19/4065* (2006.01)

(52) U.S. Cl.
CPC ........... *G01M 7/00* (2013.01); *G05B 19/4065* (2013.01); *G05B 2219/37337* (2013.01); *G05B 2219/37433* (2013.01); *G05B 2219/37434* (2013.01)

(58) Field of Classification Search
CPC ...... G05B 19/4065; G05B 2219/37434; G05B 2219/37337; G05B 2219/37433
See application file for complete search history.

(56) References Cited

U.S. PATENT DOCUMENTS

| 4,138,894 A | 2/1979 | Robert et al. |
| 4,235,432 A * | 11/1980 | Marschke ................ B65H 1/18 271/104 |

(Continued)

FOREIGN PATENT DOCUMENTS

| EP | 0215268 A1 * | 3/1987 | ......... G05B 19/4065 |
| WO | WO 8912528 A1 * | 12/1989 | ........... B06B 1/0644 |
| WO | WO 9933038 A1 * | 7/1999 | ............... B26D 5/00 |

OTHER PUBLICATIONS

Jovanovic, Jovan, Shazam It! Music Recognition Algorithms, Fingerprinting, and Processing, blog article, admitted prior art, available at http://www.toptal.com/algorithms/shazam-it-music-processing-fingerprinting-and-recognition, last accessed Sep. 10, 2015.

*Primary Examiner* — Laura Menz
(74) *Attorney, Agent, or Firm* — Andrus Intellectual Property Law, LLP (57) ABSTRACT

In an operating machine, one example of a method for monitoring operation of operating machinery includes converting an actual sound pattern generated by the machine into an audio signal and digitizing the audio signal to create a real-time acoustic fingerprint unique to the actual sound pattern. A reference database contains a plurality of stored acoustic fingerprints, each stored acoustic fingerprint in the plurality of stored acoustic fingerprints representing a unique sound pattern associated with a particular operating condition. A controller compares the real-time acoustic fingerprint to the stored acoustic fingerprints in the reference database and generates an output in response to detection of a match between the real-time acoustic fingerprint and one of the plurality of stored acoustic fingerprints. One example of the machine is a corruptor machine that converts paper webs into corrugated paperboard sheets.

20 Claims, 4 Drawing Sheets

(56) References Cited

U.S. PATENT DOCUMENTS

| | | | |
|---|---|---|---|
| 4,397,187 A | 8/1983 | Stribling | |
| 4,471,444 A * | 9/1984 | Yee | B23Q 17/0947 700/175 |
| 4,563,897 A * | 1/1986 | Moore | G01N 3/58 700/175 |
| 4,574,633 A * | 3/1986 | Ohnuki | G01H 1/003 700/175 |
| 4,577,503 A | 3/1986 | Imaino et al. | |
| 4,627,214 A * | 12/1986 | Anderson | B26D 7/2635 53/71 |
| 4,744,242 A * | 5/1988 | Anderson | B23Q 17/0947 340/683 |
| 4,834,696 A * | 5/1989 | Marschke | B65H 45/12 493/179 |
| 4,980,844 A | 12/1990 | Demjanenko et al. | |
| 5,407,265 A * | 4/1995 | Hamidieh | B23Q 17/0947 340/680 |
| 5,804,726 A | 9/1998 | Geib et al. | |
| 5,905,440 A * | 5/1999 | Julian | B26D 5/00 340/679 |
| 6,370,957 B1 | 4/2002 | Filippenko et al. | |
| 6,443,010 B1 | 9/2002 | Scofield | |
| 6,508,128 B2 | 1/2003 | Bode | |
| 6,694,285 B1 | 2/2004 | Choe et al. | |
| 6,915,235 B2 | 7/2005 | Reeves et al. | |
| 7,059,191 B2 | 6/2006 | Gupta | |
| 7,206,719 B2 | 4/2007 | Lindsay et al. | |
| 7,225,109 B2 | 5/2007 | Frerichs et al. | |
| 8,297,123 B2 | 10/2012 | Howard et al. | |
| 8,648,860 B2 | 2/2014 | Vrba et al. | |
| 9,070,275 B1 * | 6/2015 | Green | G08B 17/00 |
| 9,097,595 B2 | 8/2015 | Moore | |
| 9,727,050 B2 * | 8/2017 | Willis | G05B 19/4065 |
| 9,846,426 B2 * | 12/2017 | Willis | G05B 19/4065 |
| 9,851,788 B2 * | 12/2017 | Kim | G06F 3/013 |
| 2002/0064629 A1 * | 5/2002 | Yoshii | B31D 3/007 428/184 |
| 2004/0249510 A1 * | 12/2004 | Hanson | G06N 3/008 700/245 |
| 2007/0136657 A1 * | 6/2007 | Blumenthal | G06F 17/241 715/201 |
| 2009/0045940 A1 * | 2/2009 | Sadana | G05B 19/4065 340/539.1 |
| 2010/0125428 A1 | 5/2010 | Moore | |
| 2011/0112405 A1 * | 5/2011 | Barthe | A45D 44/005 600/459 |
| 2012/0296458 A1 | 11/2012 | Koishida et al. | |
| 2014/0214363 A1 * | 7/2014 | Hatch | G05B 19/4065 702/181 |
| 2014/0361984 A1 * | 12/2014 | Kim | G06F 3/013 345/156 |
| 2016/0026173 A1 * | 1/2016 | Willis | G05B 19/4065 700/175 |
| 2016/0091398 A1 * | 3/2016 | Pluemer | G05B 19/4065 702/183 |

* cited by examiner

METHODS FOR USING DIGITIZED SOUND PATTERNS TO MONITOR OPERATION OF AUTOMATED MACHINERY

CROSS-REFERENCE TO RELATED APPLICATION

The present application claims the benefit of U.S. Provisional Application Ser. No. 62/057,478, filed Sep. 30, 2014, the disclosure of which is hereby incorporated by reference herein.

BACKGROUND

U.S. Pat. No. 4,980,844 discloses a method and apparatus for diagnosing the mechanical condition of a machine. The method includes the following steps: sensing reference vibrational characteristics of a machine in the time domain; creating a reference signature from the reference vibrational characteristics; saving the reference signature; sensing test vibrational characteristics of the same machine in the time domain; creating a test signature from the test vibrational characteristics; automatically computing a measured distance between at least one point of the reference signature and at least one corresponding point on the test signature; automatically comparing the measured distance against a threshold value to determine if the machine is operating normally or abnormally; and providing a signal when the comparison indicates abnormal operation.

U.S. Pat. No. 5,804,726 discloses a device for testing mechanical devices using acoustic signature analysis of the sonic signature of such devices by filtering out the frequencies of interest, recreating such frequencies from their respective harmonics, and then correlating the recreated frequencies to pre-determined known characteristics or parameters developed from valid devices to predict the long term operability of other unknown devices in a noisy environment like a factory or an airport wherein other sources of sound and/or vibration are present.

U.S. Pat. No. 6,370,957 discloses a method for determining the operational condition of a rotary machine. The method comprises the steps of monitoring the machine under a baseline operating condition and collecting baseline vibrational data. A preselected number of baseline parameters are calculated from the baseline vibrational data. Next, a first baseline operational indicator is calculated from the baseline parameters, and the baseline parameters and the first baseline operational indicator are stored in a memory location. The machine is then monitored under a subsequent operating condition, and subsequent vibrational data is collected during the subsequent operating condition. A preselected number of subsequent operating parameters is calculated from the subsequent vibrational data, and a first subsequent operational indicator is calculated from the preselected number of subsequent operating parameters. Finally, the baseline data is compared to the subsequent operating data to determine the condition of the machine.

U.S. Pat. No. 6,694,285 discloses a monitoring method and device which is capable of determining the overall fitness or condition of the device being monitored while simultaneously detecting unknown or unrecognized vibration frequencies. In addition, setting threshold values corresponding to the environment surrounding the device reduces the incidence of false alarms. False alarms may be controlled while detection of true alarms may be maximized by assigning values indicative of thresholds crossed and averaging the values before issuing an alarm. The monitoring system may also provide detailed information as to the operating condition of the device so as to allow the device to operate closer to its margin of safety. Thus, the device may handle more power or speed, without the need to modify the physical design. In addition, an onboard processing unit may be used to determine when the physical load on the device is approaching its physical limits and warn the operator so as to prevent the device from exceeding those limits.

U.S. Pat. No. 6,915,235 discloses a method for processing information related to an operational condition of a machine in a process plant, where the generated information is in a first data format. The information may be generated based on data in a second format. The second format may, for example, correspond to a format used by a certain type or types of process entities, whereas the first format may, for example, correspond to a format used to process operational condition information of other types of process entities in the process plant. Providing operational condition data for various types of process entities in a common format may, for example, assist an operator in ascertaining the relative importance of the operational condition for various types of entities.

U.S. Pat. No. 7,059,191 discloses a method for determining whether a device is defective by analyzing the sound signals generated by the device. Digital samples are generated to represent the sound signals. Digital samples are transformed from the time domain to the frequency domain to generate a frequency spectrum. By comparing the levels of intensity at a corresponding frequency to the threshold levels of intensity, defective devices can be determined.

U.S. Pat. No. 7,225,109 discloses a method and apparatus for detecting mechanical problems in machinery used in a process. A model of the process is developed using a modeling technique such as advanced pattern recognition and the model is used to generate predicted values for a predetermined number of the operating parameters of the process and vibration parameters of the machinery. Statistical process control methods are used to determine if the difference between the predicted and actual measured values for one or more of the parameters exceeds a configured statistical limit. A rule set is used to indicate an actual or probable fault in the machinery.

U.S. Pat. No. 9,097,595 discloses a system for determining the source of vibration of a nipped roll assembly including: a first substantially cylindrical roll; a mating structure positioned relative to the first roll to form a nip therewith; a plurality of annular nip condition sensor units mounted on the first roll; each of the annular nip condition sensor units being positioned at different axial locations along the first roll and configured to provide nip condition signals from the nip, the signals indicating a nip condition at multiple circumferential locations; and a processor associated with the sensor units that receives signals from the sensor units. The processor is configured to convert the signals from the sensor units into nip condition readings for the multiple circumferential locations at each axial location. Such a system can detect irregularities in a roll or the mating structure that can cause undesired vibration.

U.S. Patent Application Publication No. 2012/0296458 discloses various embodiments that enable audio data, such as music data, to be captured, by a device, from a background environment and processed to formulate a query that can then be transmitted to a content recognition service. In one or more embodiments, the audio data is captured prior to receiving user input associated with audio data capture, e.g., launch of an application associated with the content recognition service, provision of user input proactively indicating that audio data capture is desired, and the like. Responsive to transmitting the query, displayable information associated with the audio data is returned by the content recognition service and can be consumed by the device.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In a corrugator that converts paper webs into corrugated paperboard sheets, one example of a proposed method described herein for monitoring operation of corrugator machinery includes convening an actual sound pattern generated by an operating corrugator machine into an audio signal and digitizing the audio signal to create a real-time acoustic fingerprint unique to the actual sound pattern. The method includes accessing a reference database containing a plurality of stored acoustic fingerprints, each stored acoustic fingerprint in the plurality of stored acoustic fingerprints representing a unique sound pattern associated with a particular operating condition. A controller compares the real-time acoustic fingerprint to the plurality of stored acoustic fingerprints in the reference database and generates an output in response to detection of a match between the real-time acoustic fingerprint and one of the plurality of stored acoustic fingerprints.

In an operating machine, one example of a proposed method described herein for monitoring operation of operating machinery includes converting an actual sound pattern generated by the machine into an audio signal and digitizing the audio signal to create a real-time acoustic fingerprint unique to the actual sound pattern. The method includes accessing a reference database containing a plurality of stored acoustic fingerprints, each stored acoustic fingerprint in the plurality of stored acoustic fingerprints representing a unique sound pattern associated with a particular operating condition. A controller compares the real-time acoustic fingerprint to the plurality of stored acoustic fingerprints in the reference database and generates an output in response to detection of a match between the real-time acoustic fingerprint and one of the plurality of stored acoustic fingerprints.

DETAILED DESCRIPTION

Machinery applied in any industry has historically been reliant on human operators who, as a course of their normal role, will adjust certain settings to control numerous operating variables, all in an effort to enhance the safety, productivity, quality, and efficiency of the machine and/or process. Experienced and competent operators rely on at least four of their five senses to conduct their work optimally. Their sense of hearing is applied in many ways, often subconsciously. These same machines require maintenance personnel to troubleshoot problems and maintain them in proper working order.

Experienced maintenance technicians also apply their senses, including their sense of hearing. Whether it is a single, unique sound or a series of sounds in a pattern, both operators and maintenance technicians store these sounds in their brain. The most experienced and efficient operators and maintenance technicians are able to store and recall these sound patterns at a level beyond what others are capable of. They "clue in" on problems, approaching problems and conditions using these "gray-matter stored" sound patterns. In many cases, the are not even aware of their actions or what drove their actions. Typically, when questioned how they knew what to do, which button to push, when to slow down, etc., they answer, "I'm not sure; I just knew." After further questioning, they will often admit that they recognized the sound and associated it with a condition, and implemented a response to that condition.

Automating the control of machinery generally attempts to duplicate the actions of the most competent human operators. Troubleshooting and diagnosing issues on automated machinery generally depends on a combination of hardware sensors, which provide feedback to certain control algorithms or loops. For example, though vibration frequency sensing as a tool has existed for many years in the area of troubleshooting and diagnosis, this concept differs from the sound pattern recognition concept mentioned above. There are conditions on any machine where sound patterns can provide feedback which is not easily detected or measured by other types of sensors, such as the above-mentioned vibration sensors.

The present disclosure provides integration of software and hardware capable of digitizing, storing, detecting, comparing, and associating specific sound patterns with appropriate control algorithm responses. Essentially, according to the present disclosure, a machine's control system duplicates the above-mentioned capabilities of an experienced human operator/technician to recognize machinery conditions based on a sound emitted by the machinery. Until recently, there did not exist a practical technology for duplicating such human behavior and applying the problem solving techniques of an experienced operator or maintenance technician. The audio content recognition technology applied in "Shazam" (the music industry smart phone app) provides one example of the type of technology that is applied in the manner described herein in more detail. Specifically, this type of technology is adapted and programmed for use with a machine such as a corrugator. Corrugators are large, long machines that perform many different processes on rolls of papers (webs) to create corrugated board. Using automated condition sensing with a corrugator enhances the efficiency of a corrugated manufacturing facility, as troubleshooting would otherwise need to be performed by a human being after hearing a particular noise himself, which, due to the size of a corrugator, is bound to happen later than a sensor would identify the condition.

According to the present disclosure, sound patterns are recorded and digitized on a properly functioning machine such as a corrugator, creating a comprehensive database of known operating conditions and their associated acoustic fingerprints. Operating conditions such as but not limited to operating states, malfunction conditions, and pre-malfunction conditions are also recorded and stored in a similar manner; in some cases these operating conditions are prompted or created intentionally in the database development effort. Sensors are installed on the machine and collect sound patterns continuously during operation. Real-time sound patterns collected by the sensors are themselves fingerprinted and then compared to the database of stored acoustic fingerprints, either continuously or when prompted by the system. When the comparison results in a match, a system controller makes the appropriate automatic adjustments, warnings, diagnostic outputs, or shut-downs, as will be described further herein below.

Figure 1:
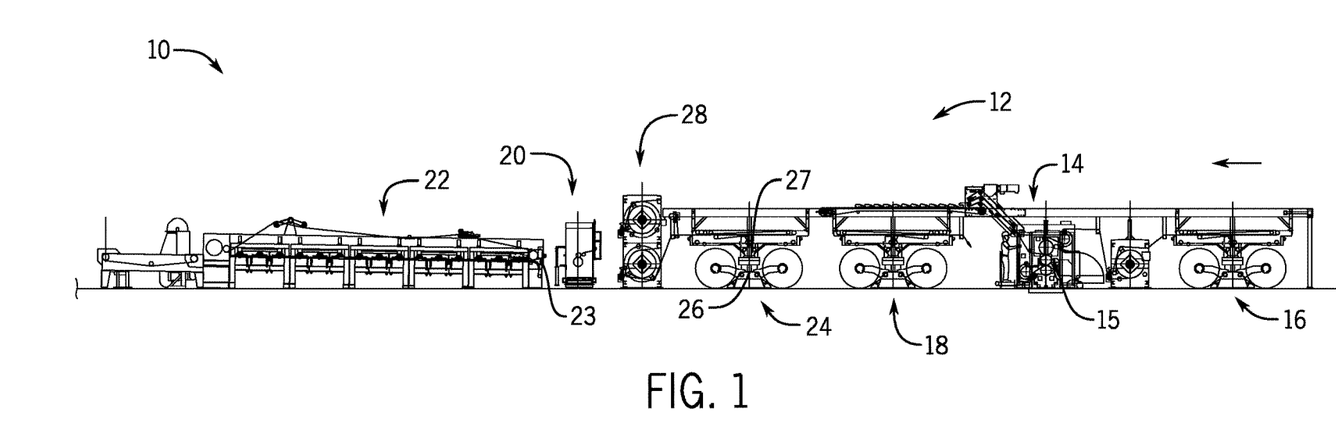
FIG. 1 illustrates one example of a wet end of a corrugator.
Figure 2:
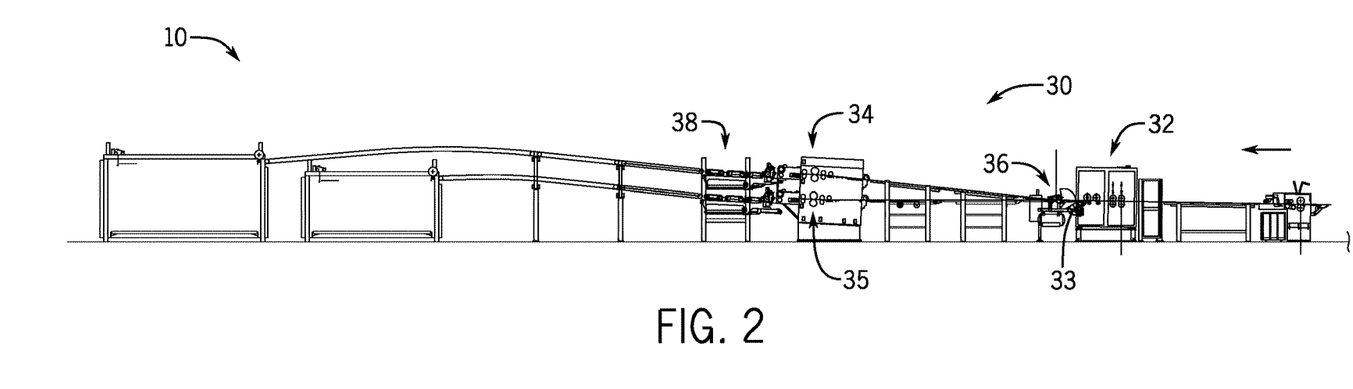
FIG. 2 illustrates one example of a dry end of a corrugator.

Although the present methods could be implemented by a control system on any type of machine, as mentioned above, one particular machine with which the present method may be implemented is a corrugator. Referring to FIGS. 1 and 2, a corrugator 10 is comprised of a system of machines that convert rolls of liner and medium papers into a continuous stream of corrugated board that is then slit and cut up into sheets suitable for manufacturing corrugated boxes. The corrugator 10 has a wet end 12 with a primary machine known as a singlefacer 14 that makes singleface web from a top liner roll and medium that is fluted within this machine and then glued to the inside surface of the top liner proximate an infeed nip 15 of the singlefacer 14. The top liner and medium are unwound from their roll stands 16, 18, respectively, and spliced at appropriate times to create a continuous process on the wet end 12 of the corrugator 10. The singleface web is then conveyed to a doublefacer position where it is heated and then run through a glue machine 20 that applies adhesive to the exposed bottom flutes of the singleface web, after which the web enters a doublefacer 22, where it is merged with a bottom liner, initially at an infeed nip 23. The doublefacer 22 includes hot plates forming the width of the corrugator and of variable length where the adhesive is cured, thereby outputting a continuous stream of bonded corrugated board. The bottom liner entering the doublefacer 22 is unwound from a roll stand 24 and run through a splicer 26 in order to maintain continuous flow of web in the event of completion of unwinding of a paper roll chucked up on the roll stand. At the splicer 26, a clamp bar located at the head 27 briefly clamps the tail end of the expiring web before a splice seal is made between the expiring web and the leading edge of the new paper roll web. The bottom liner is heated on a preheater 28 prior to entering the doublefacer 22 to facilitate the curing of the adhesive on the hot plates.

After the continuous web of bonded corrugated board exits the doublefacer 22, it enters the dry end 30 of the corrugator 10 (FIG. 2). The function of the dry end 30 is to slit the web of corrugated into individual strips that are then cut to length and stacked according to customers' orders, as required to form individual corrugated boxes, die cut wrappers, or other known applications of individual sheets of corrugated. At a slitter/scorer 32, the web of corrugated exiting the doublefacer 22 is slit into individual strips and scored with tooling to allow subsequent folding of the corrugated into flaps for boxes that will be created downstream from the corrugator 10 in converting operations. The slitter/scorer 32 can create innermost slit(s) that divide the web of corrugated into individual streams of parallel output webs that can be diverted to two or more separate levels of a cutoff knife 34, which then allows the multiple orders to be cut based on length, width, and score positions. Any edges that are unwanted are trimmed off and are directed to a trim chute 33 for recycling. The individual streams of corrugated web that are to become finished product are directed to the appropriate level of the cutoff knife 34 by a web selector table 36. After being cut by the knife 34 according to actuation of a gear train 35 associated therewith, the levels of web are directed to a stacking system 38 that creates stacks of varying height, depending on the next step in the order process.

Figure 3:
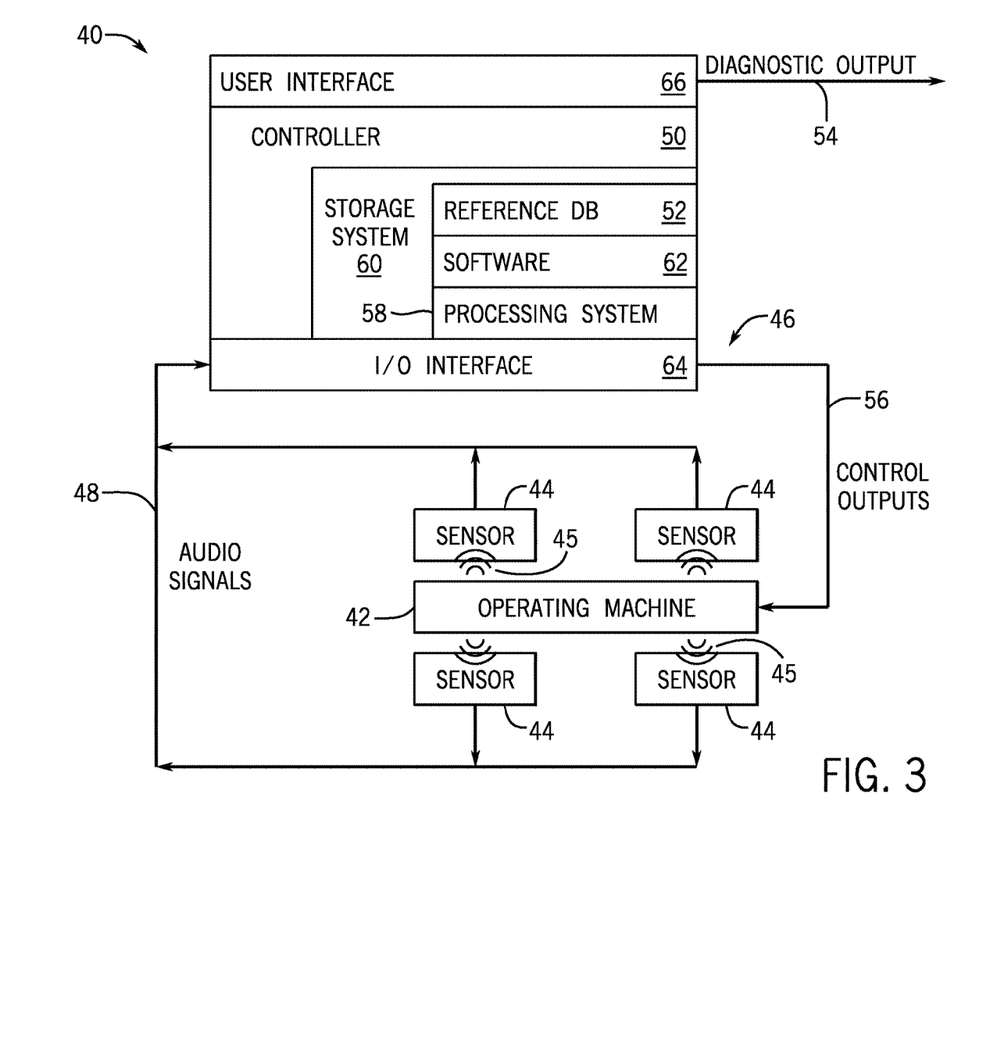
FIG. 3 is a block diagram illustrating one example of a system for carrying out the methods of the present disclosure.

FIG. 3 shows a block diagram of one example of a system 40 according to the present disclosure, with respect to which the layout and functions of the various components of the system 40 will be described. An operating machine 42 which may, for example, comprise any type of machine, an entire corrugator, or a specific corrugator machine, is provided with strategically mounted sensors 44 to detect sound 45 emanating from the machine 42 and to generate audio signals 48 corresponding to the sensor inputs. In one example, the sensors 44 are microphones that convert the sound 45 into electrical signals. The sensors 44 are connected in a feedback loop 46 that use control algorithms to provide real-time audio signals 48 to a controller 50. In one example, the controller 50 is the supervisory control system that directs all the functions of a corrugator.

The system 40 includes a reference database 52 that contains recorded and digitized sound patterns (acoustic fingerprints) from the machine 42 of known operating conditions and their associated sound patterns. For example, the reference database 52 contains recorded and digitized sound patterns (acoustic fingerprints) emanated by the machine 42 when it experiences an operating variance or abnormality, such as when it is malfunctioning or about to malfunction, when there is wear between two parts, when the machine is not operating as quickly as usual, etc. How the reference database 52 may be populated with the acoustic fingerprints will be described further herein below. Real-time audio signals 48 recorded by the sensors 44 are compared to the acoustic fingerprints stored in the reference database 52. The comparisons can be made either continuously or when prompted by the controller 50, such as at regular intervals on the order of fractions of seconds, seconds, minutes, or as-suitable for the specific machine 42 being monitored. When a comparison results in a match between a stored acoustic fingerprint and a real-time acoustic fingerprint, the controller 50 commands an output, such as but not limited to, appropriate automatic adjustments, warnings, diagnostic outputs, or the like. For example, the controller 50 can command a diagnostic output 54 that informs the operator of the machine that a particular operating condition signifying a malfunction has occurred, and which malfunction it is. Additionally or alternatively, the controller 50 can command a control output 56 to alter the operating condition such as by correcting the malfunction or shutting off the machine 42.

The controller 50 includes a processing system 58, storage system 60, software 62, input/output (I/O) interface 64 and a user interface 66. The processing system 58 loads and executes software 62 from the storage system 60. When executed by the controller 50, the software 62 directs the processing system 58 to operate as described herein in further detail in accordance with the methods of FIGS. 4 and 5.

It should be understood that one or more software application modules could be provided within the software to carry out the same operation. Similarly, while description as provided herein refers to a controller 50 and a processing system 58, it is to be recognized that implementations of such systems can be performed using one or more processors, which may be communicatively connected, and such implementations are considered to be within the scope of the description.

The processing system 58 can comprise a microprocessor and other circuitry that retrieves and executes software 62 from storage system 60. Processing system 58 can be implemented within a single processing device but can also be distributed across multiple processing devices or subsystems that cooperate in existing program instructions. Examples of processing system 58 include general purpose central processing units, applications specific processors, and logic devices, as well as any other type of processing, device, combinations of processing devices, or variations thereof.

The storage system 60 can comprise any storage media readable by processing system 58, and capable of storing software 62. The storage system 60 can include volatile and non-volatile, removable and non-removable media implemented in any method or technology for storage of information, such as computer readable instructions, data structures, program modules, or other data. Storage system 60 can be implemented as a single storage device but may also be implemented across multiple storage devices or subsystems. Storage system 60 can further include additional elements, such as a controller, capable of communicating with the processing system 58.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 66 can include a mouse, a keyboard, a voice input device, a touch input device, a motion input device, and other comparable input devices and associated processing elements capable of receiving user input from a user. Output devices such as a video display or graphical display can display an interface further associated with embodiments of the system and methods as disclosed herein. Speakers, printers, bells and other types of output devices may also be included in the user interface 66. The user interface 66 may display the diagnostic output 54 on a display screen, or may announce it via a speaker.

Methods that can be carried out by the system 40 executing software 62 as shown herein will be described further below. In general, a system 40 carrying out the methods disclosed herein below is a completely automated substitute for conventional troubleshooting by operators and maintenance technicians. Control outputs 56 are generated by utilizing feedback loops 46 and by the integration of software and hardware in the controller 50 that have the capability to digitize, store, detect, compare, and associate specific sound patterns with appropriate control algorithm responses. This provides a practical technology for duplicating human behavior and applying it in the manner of an experienced operator or maintenance technician.

Figure 4:
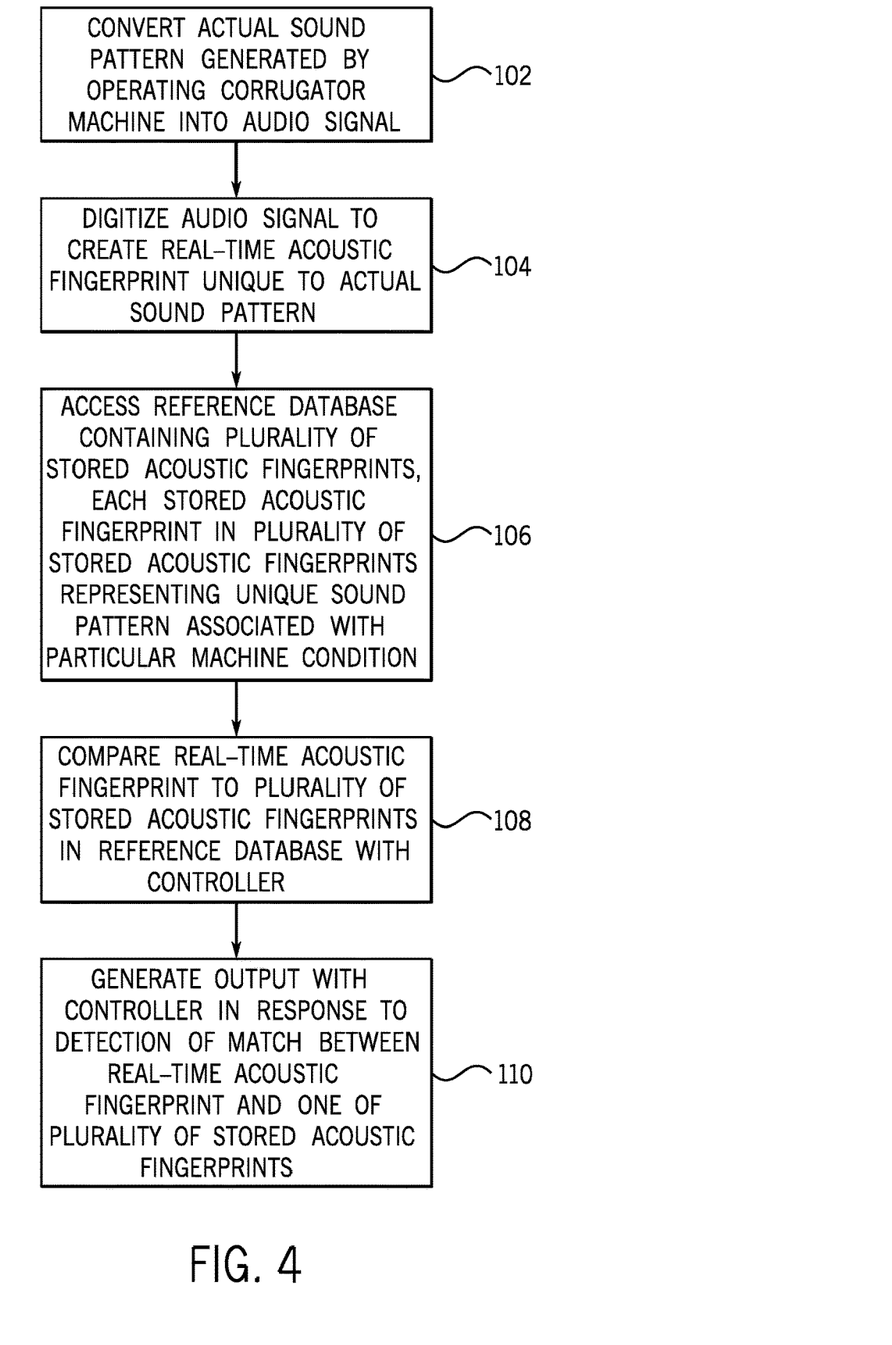
FIG. 4 is one example of a method of the present disclosure.

Turning to FIG. 4, in some embodiments, in a corrugator 10 that converts paper webs into corrugated paperboard sheets, a method for monitoring operation of corrugator machinery may include converting an actual sound pattern 45 generated by an operating corrugator machine 42 into an audio signal 48 as shown at block 102. For example, this is done by inputting the sound patterns 45 to a sensor 44 such as a microphone. In some embodiments, the actual sound patterns 45 generated by the operating corrugator machine 42 may be continuously converted into audio signals, i.e., the sensors 44 may always be on. In another example, a sensor 44 at a particular location may be turned on in response to a determination that a particular operating condition has occurred at a different location. This might be helpful if a particular operating condition such as a failure at a particular downstream location is only likely to occur if a first upstream location experiences a malfunction.

As shown at block 104, the method next includes digitizing the audio signal to create a real-time acoustic fingerprint unique to the actual sound pattern. Those having ordinary skill in the art will recognize that this can be clone in one of several ways, including but not limited to converting the analog audio signal from the sensor 44 to a digital signal; applying a type of Fast Fourier Transform to convert the digitized signal to the frequency domain; and tracking any changes in the signal, mapping them, and converting them to a digital acoustic fingerprint, usually in numeric form. In some embodiments, the method may include automatically digitizing the audio signal to create the real-time acoustic fingerprint at regular time intervals, such as every given number of seconds or minutes, as appropriate given the machine being monitored. This may help save processing time, in that the controller 50 is not constantly attempting to find a match for every moment in time that the machine 42 has been running. This may also be helpful in cases where the particular operating condition most likely to occur at a machine where the sensor 44 is located is one that takes a relatively long time to develop, and thus detection of pre-malfunction conditions (described herein below) provides enough lead time to prevent catastrophic failure or unacceptable amounts of lesser-quality or ruined product. In other examples, the audio signals from the sensors 44 are continuously digitized and compared to the stored acoustic fingerprints to determine if a match exists. This may be helpful if a particular operating condition would ruin an unacceptable amount of product in a very short period of time, and thus must be sensed as soon as possible.

Next, at block 106, the method includes accessing a reference database 52 containing a group of stored acoustic fingerprints, each stored acoustic fingerprint in the group of stored acoustic fingerprints representing a unique sound pattern associated with a particular operating condition of the corrugator machine. The particular operating condition may be related to product quality, machine productivity, waste, wear of product and/or parts, malfunction, and/or total machine failure. In fact, any operating condition that produces a variance or abnormality with respect to sound patterns that would emanate from a normally functioning machine can be singled out and saved in the database. The reference database 52 may be created and populated as discussed herein below. Next, at block 108, the method includes comparing the real-time acoustic fingerprint to the group of stored acoustic fingerprints in the reference database 52 with the controller 50. The fingerprinting and comparison algorithm may require that only a few seconds of real-time audio signals be digitized in order to determine if a match is likely or unlikely, based on certain identifying characteristics of the real-time fingerprint. This is helpful to reduce processing time. Generally, the algorithm will look for points of similarity between the two fingerprints, and if the level of similarity exceeds a given threshold, the controller 50 will indicate a match. Standard content recognition software algorithms could be used, or modified to give results specialized for application to sounds emanated by machinery. The method then includes generating an output with the controller 50 in response to detection of a match between the real-time acoustic fingerprint and one of the group of stored acoustic fingerprints, as shown at block 110. Several outputs will be described below.

In some embodiments, the method may include populating the reference database 52 with the group of stored acoustic fingerprints by convening sound patterns generated by the machine 42 during particular operating conditions into audio signals 48, digitizing the audio signals 48 and storing their acoustic fingerprints, and associating each stored acoustic fingerprint with its respective particular operating condition. This may be done, for example, by a machine operator intentionally creating each of the particular operating conditions in turn and recording the resulting sound patterns. After the machine operator intentionally creates a particular operating condition and records it, he may use the user interface 66 to assign metadata to the resulting acoustic fingerprint. In some embodiments, each stored acoustic fingerprint may also be associated with a respective output in the reference database 52. Thus, the output metadata associated with a given acoustic fingerprint will be accessed automatically in response to a fingerprint match. In other examples, a separate lookup table or similar input-output map links a particular operating condition to an output, in which case one type of output can be returned in response to many different types of operating conditions.

In some embodiments, especially where the particular operating condition is a machine malfunction or failure, the output may include a command to shut down the machine 42. In some embodiments, the output may include a command to take automatic corrective action to alter the operating condition, such as by rectifying a particular machine malfunction associated with the one of the group of stored acoustic fingerprints. Either of these commands may be made by way of control outputs 56 from the I/O interface 64. In some embodiments, the output may include an alert, such as a diagnostic output 54, that identifies the particular operating condition associated with the one of the group of stored acoustic fingerprints to a machine operator, such as by way of user interface 66. As mentioned above, in some embodiments, the output may include a command to turn on one of the sensors at a particular location where that sensor had previously been off.

In some embodiments, the method may further include determining if a sound pattern preceding the match between the real-time acoustic fingerprint and the one of the group of stored acoustic fingerprints indicates an impending machine malfunction, and if so, storing an acoustic fingerprint of the preceding sound pattern in the reference database 52 and associating it with a pre-malfunction condition of the machine 42. For example, after the program has run for a while on the machine 42, the machine operator may choose to review the program's history to see where matches between a real-time acoustic fingerprint and a stored acoustic fingerprint were made, signifying a particular operating condition such as a malfunction or failure. He may review the audio file from a period of time right before the match was made to determine if any of the sound patterns within that period of time vary from sound patterns the operator would associate with a normally functioning machine. If he does notice an abnormal, distinctive pattern that precedes the operating condition, he can select via the user interface 66 to create a new acoustic fingerprint representing the sound pattern made during this period of time. He may associate this new acoustic fingerprint with a pre-malfunction condition, may enter metadata regarding the malfunction or failure that is about to occur, and may associate a corrective action, a warning, or a shut-down command with this pre-malfunction acoustic fingerprint. Therefore, in some embodiments, when the one of the group of acoustic fingerprints (matched to the real-time acoustic fingerprint) is associated with the pre-malfunction condition, the output may include an alert that identifies the pre-malfunction condition to a corrugator operator.

In another example, the algorithm may call for recording of sound patterns made when the machine is functioning properly. The acoustic fingerprints generated from these normal functioning sound patterns may be compared to a real-time acoustic fingerprint, and if no match exists, a diagnostic output 54 may alert the corrugator operator that he should review the noise to determine if it signifies an operating condition such as a machine malfunction or a pre-malfunction condition. If so, the operator can command the controller 50 to save this new acoustic fingerprint in the reference database 52 for fixture recognition of the malfunction. Alternatively, the controller 50 may self-learn that an abnormal sound pattern corresponds to an operating condition such as a malfunction condition and may assign the corresponding acoustic fingerprint to a dummy malfunction associated with the particular part of machinery from which the sound pattern was collected, which the operator can later-rename upon reviewing the system's activity log. Similarly, if the controller 50 recognizes that an abnormal sound pattern occurs within a predetermined amount of time before a match is made with an already-stored acoustic fingerprint that signifies a malfunction, the controller 50 can automatically store this abnormal sound pattern as a new pre-malfunction acoustic fingerprint.

In some embodiments, the method may include installing sensors 44 on the machine 42 to collect sound. The sensors may be installed by machine operators after or upon installation of the machine, for example, every ten feet along the corrugator 10. In another example, referring to FIGS. 1 and 2, the sensors 44 are installed proximate at least one of the following corrugator machine components: an infeed nip 15 of a singlefacer 14, a head 27 of a splicer 26, an infeed nip 23 of a doublefacer 22, a gear train 35 of a knife 34, and/or a trim chute 33 of a slitter/scorer 32. Preferably, sensors 44 are installed at each of these locations. Sensors 44 may be installed every ten feet (or another distance from one another) in addition to being installed at each of these locations. The sensors 44 could be installed integrally with the corrugator machine, and should be protected from moisture, vibration, and mechanical impact, as any sensitive equipment on a piece of machinery needs to be.

By way of example, if a sensor at the infeed nip 15 of the singlefacer 14 collects a screeching sound, this sound may be transferred as an audio signal to the controller 50, which would convert the audio signal to a real-time acoustic fingerprint. The controller 50 would search the reference database 52 for a matching stored acoustic fingerprint representing the screeching sound. The reference database 52 would return a match indicating a particular operating condition, for example that the roller at the infeed nip is seizing up instead of turning as it normally should. A diagnostic output 54 may be generated that indicates this problem at the user interface 66. The corrugator operator could go fix the problem with lubricant, or the controller 50 could send a shut-off signal to the singlefacer 14 or to the entire corrugator 10. By way of another example, a flutter sound could correspond to a looseness of paper at the infeed nip 15, and the controller 50 could send a control output 56 to automatically increase the pressure between the rollers to counteract this looseness.

As an example of how the feedback loop 46 could function at the infeed nip 15 of the singlefacer 14, if the corrugating and liner rolls are loaded too much, this causes excessive wear and damage, and creates a different sound pattern than if the rolls are loaded correctly. The controller 50 could output a command to reduce the loading when such a sound pattern is detected. If the loading is reduced so much that the loading is too light, this does not flute the web enough and another sound pattern, different from both the correct loading sound pattern and the too-high loading sound pattern, is generated. If this sound is detected, the loading between the rolls can be increased. This control could continue until the real-time sound pattern matches the acoustic fingerprint for a correctly-loaded condition.

At the head 27 of the splicer 26, the clamp bar that briefly prevents the paper from moving while the trailing end of the old paper and the leading end of the new paper are spliced together can tend to become worn. When this occurs, sliding of the trailing end of the expiring web under the clamp bar creates a noise that is much different than a stopping of the paper. In response to an acoustic fingerprint match for this sliding noise, the controller 50 may send a control output 56 to speed up the leading end of the new paper or to slow down the trailing end of the old paper in order to make sure a splice can still be made, rectifying the malfunction at least until the clamp bar is completely incapable of slowing the paper at all and needs to be replaced.

At the gear train 35 of the knife 34, when the servo motor fails, a chattering in slots between the gears in the gear train may result. In response to an acoustic fingerprint match for this malfunction, the controller 50 could output a diagnostic to indicate that there is a bad servo drive, for example via the user interface 66.

If the trim chute 33 of the slitter/scorer 32 becomes jammed, the trimmed paper may rattle in the chute. In response to an acoustic fingerprint match for this malfunction, the controller 50 may output a diagnostic to indicate that the trim chute needs to be serviced. Alternatively, an automated device could be used to un-jam the chute.

Figure 5:
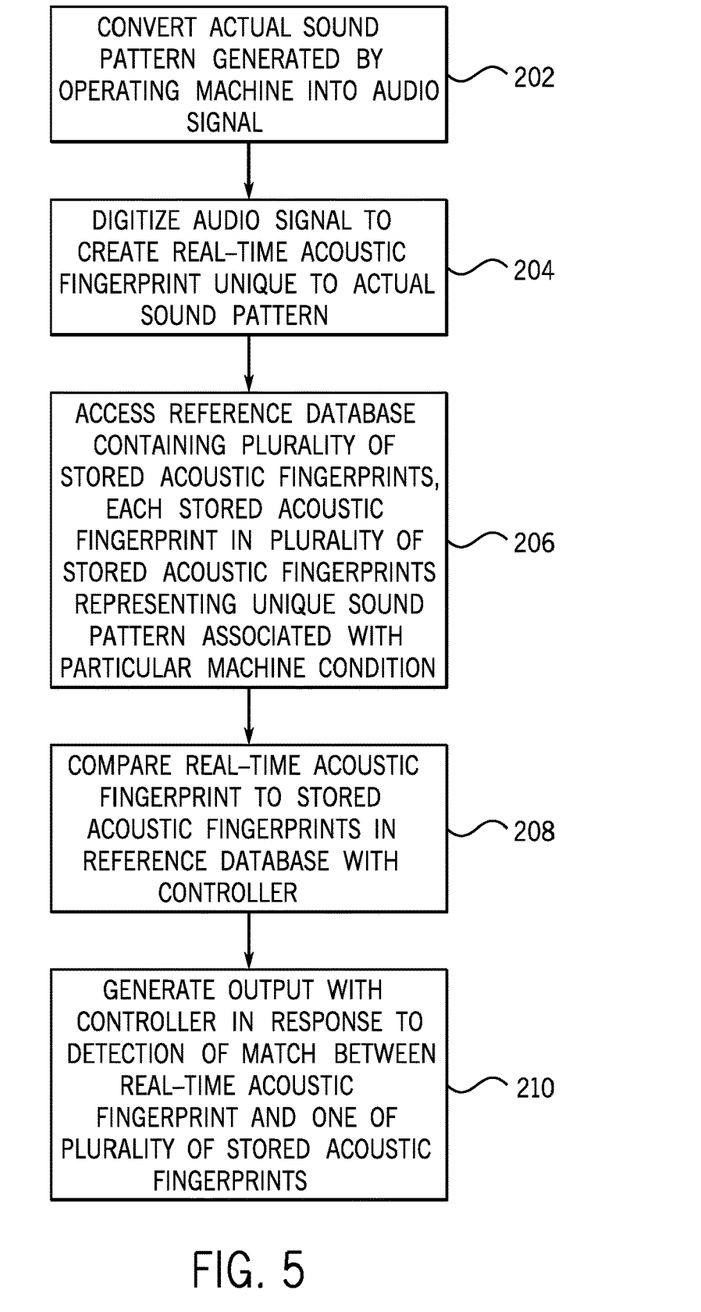
FIG. 5 is another example of a method of the present disclosure.

As mentioned, the above system and method could be implemented with any type of machine, as shown in FIG. 5. For example, in an operating machine, a method for monitoring operation of operating machinery may include converting an actual sound pattern generated by the machine 42 into an audio signal 48 (block 202); digitizing the audio signal 48 to create a real-time acoustic fingerprint unique to the actual sound pattern (block 204); accessing a reference database 52 containing a group of stored acoustic fingerprints, each stored acoustic fingerprint in the group of stored acoustic fingerprints representing a unique sound pattern associated with a particular operating condition (block 206); comparing the real-time acoustic fingerprint to the stored acoustic fingerprints in the reference database 52 with a controller 50 (block 208); and/or generating an output 54, 56 with the controller 50 in response to detection of a match between the real-time acoustic fingerprint and one of the group of stored acoustic fingerprints (block 210).

In the present description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. In a corrugator that converts paper webs into corrugated paperboard sheets, a method for monitoring operation of corrugator machinery, the method comprising:
   with a sensor, converting an actual sound pattern generated by an operating corrugator machine into an audio signal;
   receiving the audio signal with a controller, and with the controller, digitizing the audio signal to create a real-time acoustic fingerprint unique to the actual sound pattern;
   with the controller, accessing a reference database in a storage system, the reference database containing a plurality of stored acoustic fingerprints, each stored acoustic fingerprint in the plurality of stored acoustic fingerprints representing a unique sound pattern associated with a particular operating condition of the corrugator machine;
   comparing the real-time acoustic fingerprint to the plurality of stored acoustic fingerprints in the reference database with the controller; and
   in response to detecting a match between the real-time acoustic fingerprint and one of the plurality of stored acoustic fingerprints with the controller, generating an output command with the controller, which output command is associated with the particular operating condition in the storage system;
   receiving and carrying out the output command at a component of the corrugator machine.

2. The method of claim 1, further comprising populating the reference database with the plurality of stored acoustic fingerprints by converting sound patterns generated by particular operating conditions of the corrugator machine into audio signals, digitizing the audio signals and storing their acoustic fingerprints, and associating each stored acoustic fingerprint with its respective particular operating condition.

3. The method of claim 2, further comprising intentionally creating the particular operating conditions and recording the resulting sound patterns.

4. The method of claim 2, further comprising associating each stored acoustic fingerprint with a respective output command in the reference database.

5. The method of claim 4, wherein the output command comprises a command to shut down the corrugator machine, and the method further comprises shutting down the corrugator machine.

6. The method of claim 4, wherein the output command comprises a command to generate an alert that identifies the particular operating condition associated with the one of the plurality of stored acoustic fingerprints to a corrugator operator, and the method further comprises displaying the alert at a user interface of the corrugator machine.

7. The method of claim 4, wherein the particular operating condition comprises a particular machine malfunction, and the output command comprises a command to take automatic corrective action to rectify the particular machine malfunction associated with the one of the plurality of stored acoustic fingerprints, and the method further comprises taking the corrective action.

8. The method of claim 7, further comprising determining if a sound pattern preceding the match between the real-time acoustic fingerprint and the one of the plurality of stored acoustic fingerprints indicates an impending machine malfunction, and if so, storing an acoustic fingerprint of the preceding sound pattern in the reference database and associating it with a pre-malfunction condition of the corrugator machine.

9. The method of claim 8, wherein the particular operating condition comprises the pre-malfunction condition, and the output command comprises a command to generate an alert that identifies the pre-malfunction condition to a corrugator operator.

10. The method of claim 1, further comprising installing sensors on the corrugator machine to collect sound.

11. The method of claim 10, further comprising installing the sensors proximate at least one of the following corrugator machine components:
- an infeed nip of a singlefacer;
- a head of a splicer;
- an infeed nip of a doublefacer;
- a gear train of a knife; and
- a trim chute of a slitter/scorer.

12. The method of claim 10, wherein the output command comprises a command to turn on one of the sensors at a particular location where that sensor had previously been off.

13. The method of claim 1, further comprising continuously converting the actual sound pattern generated by the operating corrugator machine into the audio signal.

14. The method of claim 13, further comprising automatically digitizing the audio signal to create the real-time acoustic fingerprint at regular time intervals.

15. In a corrugator that converts paper webs into corrugated paperboard sheets, a method for monitoring operation of corrugator machinery, the method comprising:
(a) with a sensor, converting an actual sound pattern generated by a machine into an audio signal;
(b) receiving the audio signal with a controller, and with the controller, digitizing the audio signal to create a real-time acoustic fingerprint unique to the actual sound pattern;
(c) with the controller, accessing a reference database in a storage system of the controller, the reference database containing a plurality of stored acoustic fingerprints, each stored acoustic fingerprint in the plurality of stored acoustic fingerprints representing a unique sound pattern associated with a particular operating condition of the machine;
(d) comparing the real-time acoustic fingerprint to the plurality of stored acoustic fingerprints in the reference database with the controller;
(e) in response to detecting a match between the real-time acoustic fingerprint and one of the plurality of stored acoustic fingerprints generating a corrective output command with the controller, which corrective output command is associated with the particular operating condition in the storage system;
(f) receiving and carrying out the corrective output command at a component of the machine; and
(g) thereafter repeating steps (a) through (f) until the real-time acoustic fingerprint matches a stored acoustic fingerprint representing a unique sound pattern associated with a correct operating condition of the machine.

16. The method of claim 15, further comprising populating the reference database with the plurality of stored acoustic fingerprints by intentionally creating particular operating conditions, converting sound patterns generated by the machine during the particular operating conditions into audio signals, digitizing the audio signals and storing their acoustic fingerprints, and associating each stored acoustic fingerprint with its respective particular operating condition.

17. The method of claim 16, further comprising associating each stored acoustic fingerprint with a respective corrective output command in the reference database.

18. The method of claim 17, wherein the particular operating condition comprises a particular machine malfunction, and wherein the corrective output command comprises
a command to take automatic corrective action to rectify the particular machine malfunction associated with the one of the plurality of stored acoustic fingerprints; and
wherein the method further comprises taking the corrective action.

19. The method of claim 15, further comprising continuously converting the actual sound pattern generated by the machine into the audio signal and automatically digitizing the audio signal to create the real-time acoustic fingerprint at regular time intervals.

20. The method of claim 15, wherein the machine is a corrugator that converts paper webs into corrugated paperboard sheets, and the method further comprises installing sensors proximate at least one of the following corrugator machine components:
- an infeed nip of a singlefacer;
- a head of a splicer;
- an infeed nip of a doublefacer;
- a gear train of a knife; and
- a trim chute of a slitter/scorer.

* * * * *

UNITED STATES PATENT AND TRADEMARK OFFICE
CERTIFICATE OF CORRECTION

PATENT NO. : 9,945,755 B2  
APPLICATION NO. : 14/870256  
DATED : April 17, 2018  
INVENTOR(S) : Blake Pluemer Page 1 of 1

It is certified that error appears in the above-identified patent and that said Letters Patent is hereby corrected as shown below:

On the Title Page

In the Abstract, Line 15, "corruptor" should read --corrugator--.

In the Claims

In Claim 15, Column 14, Line 3, add a "," between the words "fingerprints" and "generating".

Signed and Sealed this  
Tenth Day of July, 2018

Andrei Iancu  
*Director of the United States Patent and Trademark Office*